United States Patent [19]

Inoue et al.

[11] Patent Number: 5,225,810
[45] Date of Patent: Jul. 6, 1993

[54] FIRE DETECTOR FOR DISCRIMINATING SMOKE AND FLAME BASED ON OPTICALLY MEASURED DISTANCE

[75] Inventors: Masao Inoue; Yoshinori Igarashi, both of Tokyo, Japan

[73] Assignee: Nohmi Bosai Ltd., Tokyo, Japan

[21] Appl. No.: 748,187

[22] Filed: Aug. 20, 1991

[30] Foreign Application Priority Data

Aug. 23, 1990 [JP] Japan .................................. 2-219918

[51] Int. Cl.⁵ .......................................... G08B 17/12
[52] U.S. Cl. .................................... 340/577; 340/630; 250/574
[58] Field of Search .............. 340/577, 578, 628, 630; 250/574

[56] References Cited

U.S. PATENT DOCUMENTS

| | | | |
|---|---|---|---|
| 3,444,544 | 5/1969 | Pearson | 340/630 |
| 3,980,997 | 9/1976 | Berns | 340/630 |
| 4,893,026 | 1/1990 | Brown de Colstoun | 340/63 |

*Primary Examiner*—Jin F. Ng
*Assistant Examiner*—Christine K. Oda
*Attorney, Agent, or Firm*—Wenderoth, Lind & Ponack

[57] ABSTRACT

A fire detection apparatus discriminates white smoke, black smoke and flame in a protected area based on changing characteristics of optically measured distances. The apparatus includes a distance meter having a light emitter for emitting a pulse of light energy towards a reference object, such as a distant wall, and a light detector for receiving the pulse of light energy reflected from the reference object or any intervening object. A distance to the reference object or the intervening object is determined based on the lapse of time from the emission to the detection of the pulse of light energy. White smoke is deemed detected when the distance measured is less than a reference difference and is substantially free of fluctuations. Black smoke is detected when the distance measured is more than the reference distance and is also substantially free of fluctuations. Flame is detected when the distances measured differ from the reference distance and fluctuates substantially.

4 Claims, 9 Drawing Sheets

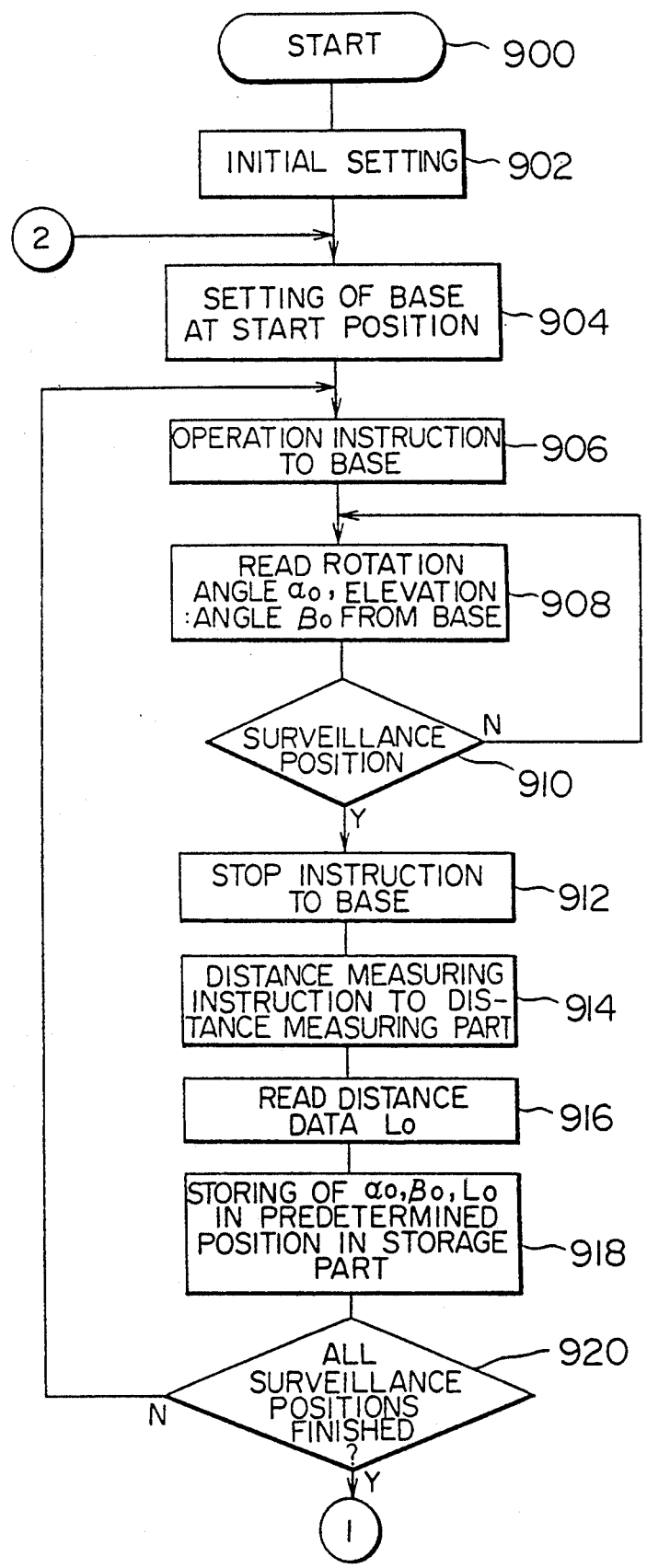

FIRE DETECTOR FOR DISCRIMINATING SMOKE AND FLAME BASED ON OPTICALLY MEASURED DISTANCE

FIELD OF THE INVENTION

The present invention relates to a fire detecting device and more particularly, to a device that detects the outbreak of a fire by means of a beam type distance meter. The beam type distance meter measures the distance to an object by projecting a beam of light onto the object from a transmitter and receiving the light reflected therefrom using a receiver.

Prior Art

Various types of fire detectors are known, such as thermal type detectors which detect heat from a fire causing a bimetal to flip over or a pneumatic chamber to expand, ionization type detectors which detect changes in ionization current caused by smoke, photoelectric type detectors which detect light scattered by smoke, light obscuration type detectors which detect reductions in light permeability due to the presence of smoke, beam light obscuration type (separate type) detectors which detect the presence of smoke between a separately arranged light transmitter and receiver, and radiation type (flame) detectors like infrared detectors which identify a fire outbreak by detecting heat rays from flames or radiation levels of a flame flicker.

Nevertheless, when a light scattering type smoke detector is used for fire surveillance over a large space, it is necessary to install a large number of smoke detectors, for instance, on the ceiling. This also applies to a beam type detector used for fire detection in a wide area, and a number of light transmitters and receivers must be installed to sufficiently cover the surveillance area. Further, although a thermocouple is effective for detection of flaming fires, it is ineffective with respect to a smouldering fire existing at the early stage of a fire.

SUMMARY OF THE INVENTION

The present invention is aimed at providing a fire detecting device which detects fire, more specifically smoke and flame, using a method different from those employed in the conventional fire detectors described above.

Specifically, the present invention offers a fire detecting method comprising a step at which a detected value based on reflected light from a beam of light projected onto an opposing surface is measured by a beam type measuring means and previously stored as a reference value, a step at which a value detected and measured by the beam type measuring means during fire surveillance is compared with the previously stored reference value, and a step at which a judgement of 'fire' is made if a result of the comparison shows a deviation of the detected value from the reference value.

The detected value may be a distance to the opposing surface or a reflection return time of the reflected light, or may also be a received light intensity of the returning reflected light.

The present invention also provides a fire detecting device equipped with a beam type distance measuring means to project a beam of light toward an opposing surface and measure the distance to the opposing surface or reflection time on the basis of the light reflected from the opposing surface, a storage means to previously measure and store as a reference value the distance to the opposing surface or the reflection time, a comparison means to compare the distance or reflection time measured by the beam type distance measuring means during fire surveillance with the reference value stored in the storage means, and a fire discriminating means to make a 'fire' judgement on the basis of a result of the comparison by the comparison means.

In this case, it is prefereble that at least the beam type distance measuring means be installed on a mounting base which can freely be turned in any direction, thus enabling measurement of distances to a plurality of opposing surfaces or a plurality of reflection times, and that the distance to each of the plurality of opposing surfaces or each of the reflection times be previously stored in the memory means.

The fire discriminating means determines that black smoke is being generated if the distance or reflection time measured by the beam type distance measuring means exceeds the reference value stored in the storage means and there is hardly any fluctuation observed, that white smoke is being generated if the distance or reflection time measured by the beam type distance measuring means is less than the reference value store in the storage means and there is hardly any fluctuation observed, and that flames are being generated if the distance or reflection time measured by the beam type distance measuring means differs and fluctuates from the reference value stored in the storage means.

The storage means used for this purpose may already have the reference value stored before it is installed, or may be arranged in such a way that it stores as a reference value the distance to the opposite surface or reflection time measured by the beam type distance measuring means after it is installed.

If there is smoke or flame between the beam type distance measuring means and an opposing surface such as a wall face (a reference position which provides a reference value) toward which said measuring means is directed, said measuring means will give a different reading from the reference value of the distance to the opposite surface (or reflection time) or reflected light intensity. Therefore, by previously storing the reference value and comparing a distance or reflected light intensity obtained from the measuring beam reaching the measuring means with the stored reference value, the outbreak of a fire is detected.

BRIEF DESCRIPTION OF THE DRAWINGS

The invention will now be described with reference to the accompanying drawings wherein:

FIG. 1 is a drawing which shows a space where tests for distance measurement using distance meter RF were conducted.

FIG. 2 shows measured distance changes with white smoke obtained as a result of the tests.

FIG. 3 shows measured reflected light intensity obtained as a result of the tests with white smoke.

FIG. 4 shows measured distance changes with black smoke obtained as a result of the tests.

FIG. 5 shows measured reflected light intensity obtained as a result of the tests with black smoke.

FIG. 6 shows measured distance changes with flames obtained as a result of the tests.

FIG. 9A and 9B are flowcharts showing an embodiment of the program for the fire alarm device according to the present invention.

DETAILED DESCRIPTION OF THE PREFERRED EMBODIMENT

The following describes an embodiment according to the present invention.

As described above, the present invention generally relates to a fire detecting device which detects smoke from a fire by using a beam type distance meter. The beam type distance meter measure the distance to an object by projecting a laser beam from a transmitter to the object and receiving the light reflected therefrom using a receiver. First, the principles which form the basis of the detecting device will be described.

Figure 1:
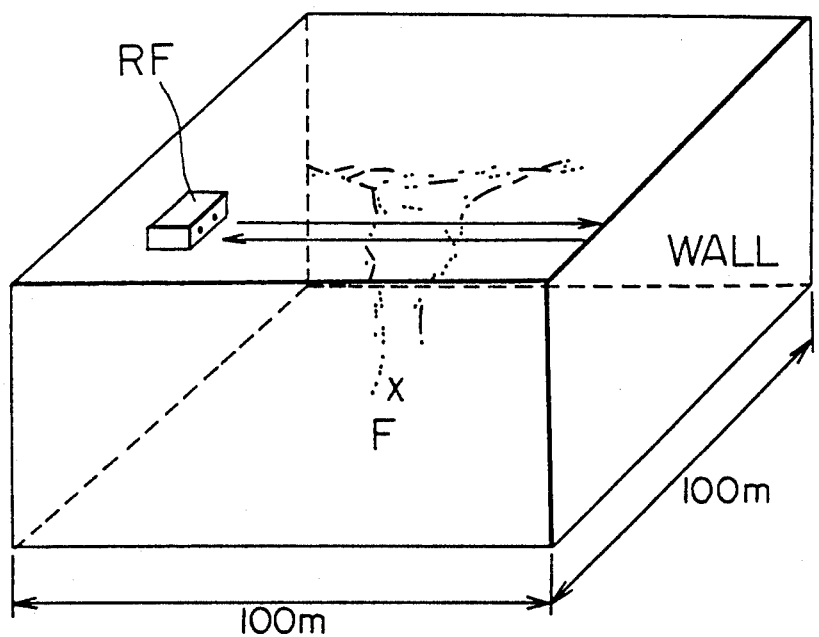
FIG. 1~6 are drawings describing the functions of the present invention.

As shown in FIG. 1, a beam type (laser type) distance meter RF was installed at a corner of a space, and a fire tray containing fuel such as oil and wood pieces was placed at a point F to conduct fire tests. By projecting a laser beam from the point where the distance meter RF was installed to the fire tray containing fuel such as oil and wood pieces and located at the point Fa, measurement of the distance to the fire tray was made. It was possible to measure the precise distance to the fire tray when the fuel in the fire tray was not burning, but no precise measurement of distance to the fire tray could be made while smoke or flame was being generated.

Then, tests were conducted to observe the influence of smoke and flame on the distance measurement by the beam type distance meter, which revealed the following findings.

The laser type distance meter was used as the beam type distance meter and arranged in such a way that the distance to the opposite surface could be measured by projecting a laser beam onto the opposite surface from the distance meter. The fire tray was located between the distance meter and the opposite surface, and wood pieces and oil were burnt in the fire tray.

Figure 2:
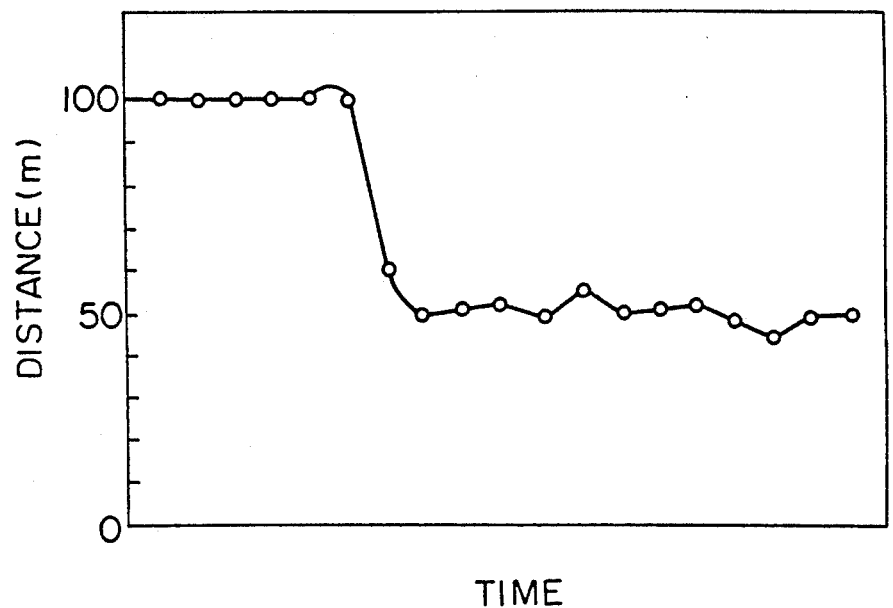

With white smoke generated by burning wood pieces in the fire tray and flowing into the measuring laser beam, the distance meter indicated a shorter distance to the opposing surface than that measured without smoke, and moreover this measured distance was close to the distance to the location of the smoke (Refer to FIG. 2).

Figure 4:
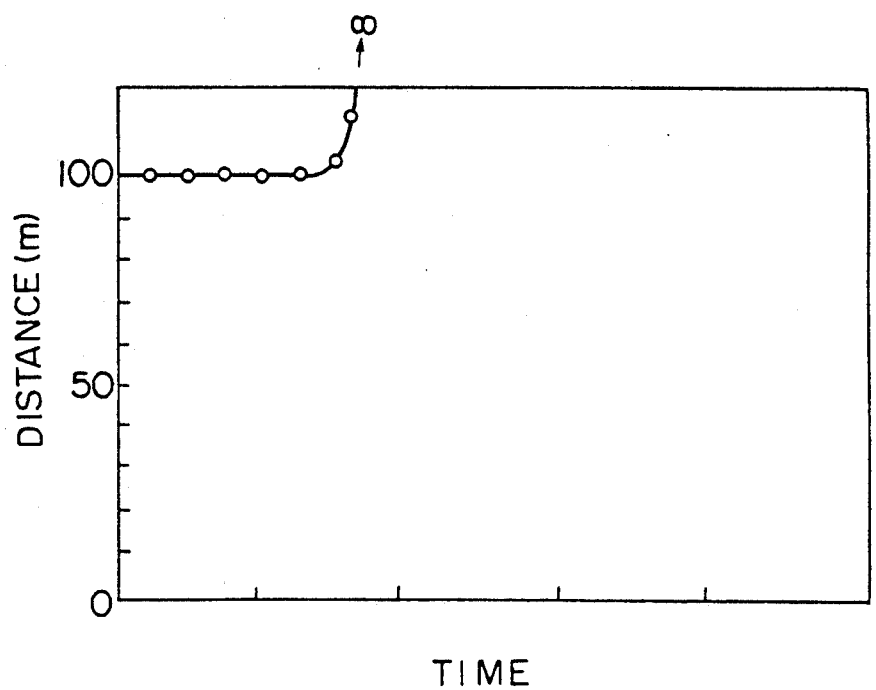

On the other hand, with black smoke generated by burning oil in the fire tray and flowing into the measuring laser beam, the distance meter, differing from the case with white smoke, indicated a longer measured distance (infinite distance in the specific test) than the distance to the opposing surface, i.e. the surface on which the laser beam is reflected when there is no smoke (Refer to FIG. 4).

Figure 5:
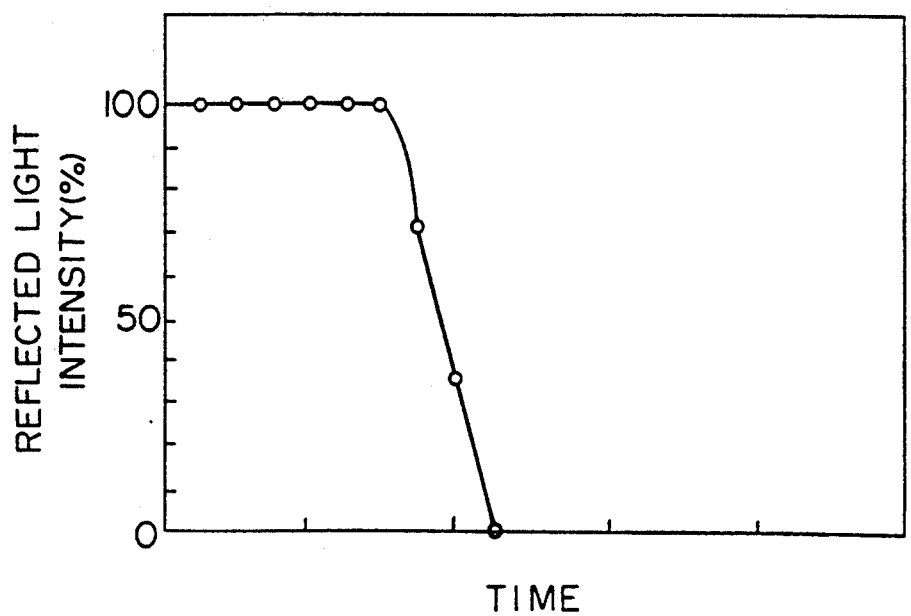

It has also been found from the tests that in the presence of white smoke the reflected light intensity received by the distance meter, i.e. the intensity of the measuring beam returned to and received by the distance meter, decreases (Refer to FIG. 3) although it varies with distance to smoke, and that the intensity comes close to zero when there is black smoke (Refer to FIG. 5).

Results of these tests are shown in FIG. 2~5.

FIG. 2 shows the measured distance changes (vertical axis) with respect to the lapse of time (horizontal axis) after generation of the white smoke.

Figure 3:
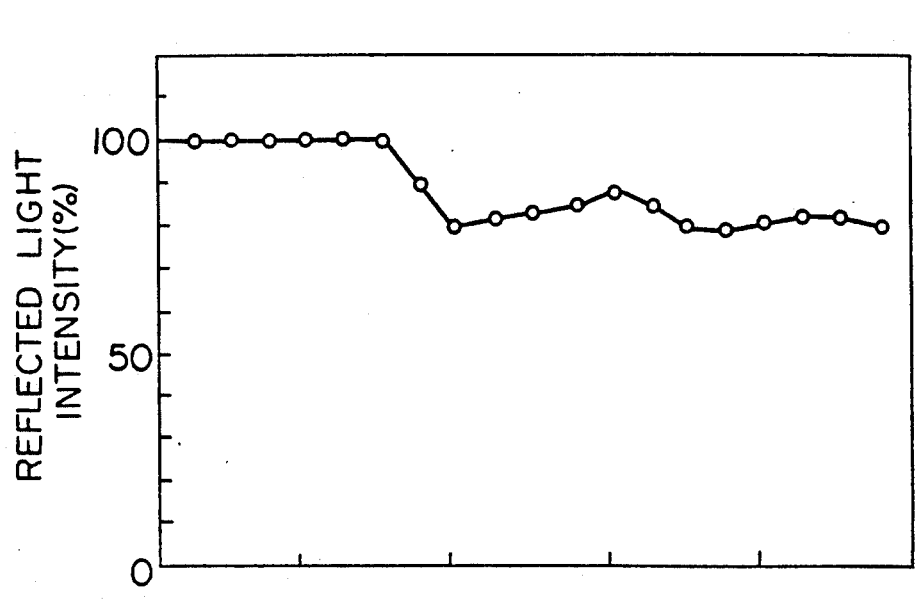

FIG. 3 shows changes of measured reflected light intensity (vertical axis) with respect to the lapse of time (horizontal axis) after generation of white smoke.

FIG. 4 shows measured distance changes (vertical axis) with respect to the lapse of time (horizontal axis) after generation of black smoke.

FIG. 5 shows changes of measured reflected light intensity (vertical axis) with respect to the lapse of time (horizontal axis) after generation of black smoke.

As can be seen, the distance meter indicates a shorter distance and a longer distance than the actual distance to the opposite surface in the presence of white smoke, and black smoke respectively. It is assumed that these differences in the readings may be attributed to the following causes, i.e. in the presence of white smoke the laser beam is reflected by the smoke and the distance meter detects this slightly reflected laser beam, and in the presence of black smoke the laser beam is absorbed by the smoke and thus the distance meter can not detect any reflection of the laser beam.

Further, as the laser beam is projected toward flames, the distance meter indicated a distance which was different from the distance measured to the same point in the absence of a flame, and further the distance fluctuated and differed from the case with smoke.

Figure 6:
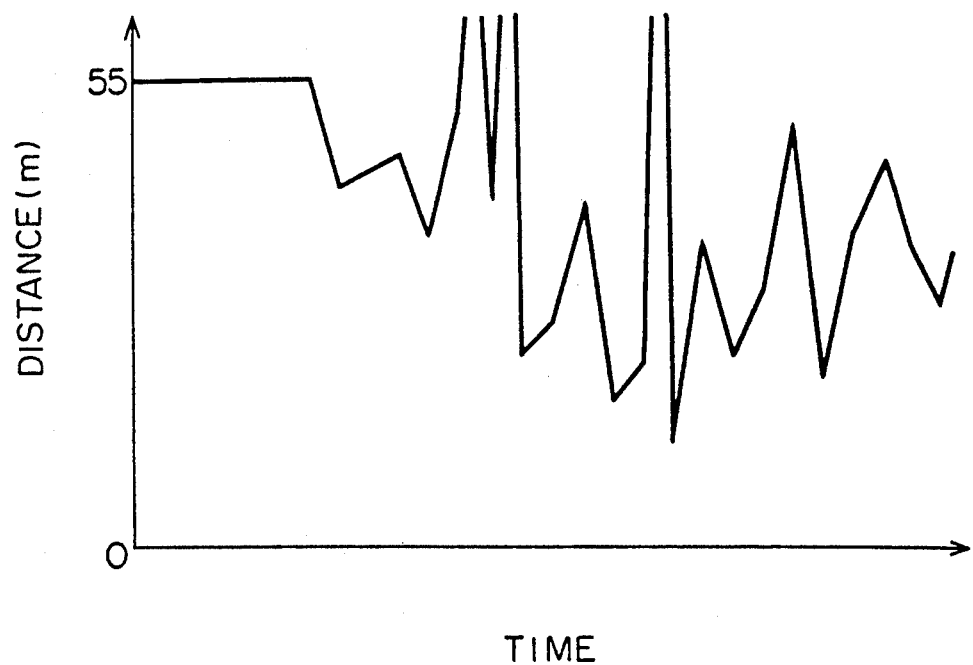

The results of the tests with flames are shown in FIG. 6 which shows the measured distance changes (vertical axis) with respect to the lapse of time (horizontal axis) after generation of flame. Further, when the flames were located at a close distance (e.g. 15 m), there were fluctuating changes in readings around a distance far from the flames contrary to the example shown in FIG. 6.

Further, when the laser beam was projected toward the opposite surface through the flames, the distance meter also indicated a different distance compared with the distance measured when there were no flames.

It is assumed that such changes in measured distances with the flames are caused by changes in the phase of the laser beam projected form the distance meter due to the flames.

In order to examine the influence of sunlight and illumination lamps on the distance meter, sunlight and light from illumination lamps were reflected by a mirror onto the distance meter, and also light from an illumination lamp and rotating lamp were directly applied to the distance meter. The distance meter showed no change in its reading of the distance to the opposite surface.

The laser type distance meter used in these tests was one requiring no reflection mirror on the opposite surface. Those phenomena described above occurred when a laser beam with a wavelength ranging from 0.6 to 3 microns was used.

As can be seen from the foregoing, it is possible to detect smoke and flame from fire by a method which differs from the conventional light scattering method and light obscuration method if the beam type distance meter is installed to measure the distance to an opposing surface such as a wall face or ceiling surface in a structure and to make fire related judgements when there is a change in the measured distance and/or reflected light intensity of the beam.

The following judgements are made.

① When the measured distance shows a change (shorter or longer) from the reference distance (e.g. distance to the wall surface), there is smoke between the distance meter and the reference reflection surface (e.g. wall face).

② It can be seen that white smoke is being generated when the measured distance is shorter than the reference distance. It is also possible to know the distance to the smoke in the case of white smoke.

③ It can be seen that black smoke is being generated when the measured distance is longer than the reference distance.

④ It can be seen that flames are being generated when there is a fluctuation of the measured distance.

⑤ Besides detecting smoke generation due to fire from item ①, it is possible to discriminate the kinds of smoke from items ② and ③ and flames from item ④.

⑥ When the reflected light intensity measured shows a change from the reference reflected light intensity (e.g. received light intensity of the measuring beam as reflected on the wall face), there is smoke between the distance meter and the reference reflection surface.

⑦ It can be seen that black smoke is being generated when the reflected light intensity measured shows a great decrease from the reference reflected light intensity.

⑧ It can be seen that white smoke is being generated when the reflected light intensity measured shows little decrease from the reference reflected light intensity.

⑨ It is possible to detect smoke generation due to fire from item ⑥ and to discriminate kinds of smoke from items ⑦ and ⑧.

10 It is possible to detect smoke and flame generation from the results of a comparison between the measured distance and the reference distance, and also to make more accurate discrimination as to kinds of smoke by combined use with the results of a comparison between the reflected light intensity measured and the reference reflected light intensity.

Therefore, a fire detecting device which detects the fire related phenomena of smoke and flame is obtained by providing a discriminating circuit which compares the distance measured and/or the reflected light intensity received by the distance meter with the reference distance and/or the reference reflected light intensity in the distance meter assembly or a fire control panel or a repeater to which the distance meter is connected.

The reference distance and/or the reference reflected light intensity are set by previously measuring the distance from the detector to the reflecting object, the reflection rate of the reflecting object, etc. and storing them in storage means as reference values. By comparing the set reference values with the measured values it is possible to detect generation of smoke and flame. By monitoring differences from the reference value by comparison, it is also possible to discriminate whether the difference is caused due to the presence of smoke or flame, or interruption of the light beam by a human or object, thus preventing a false alarm. Further, it is possible to ascertain the characteristics of smoke if the difference is caused by smoke.

Figure 7:
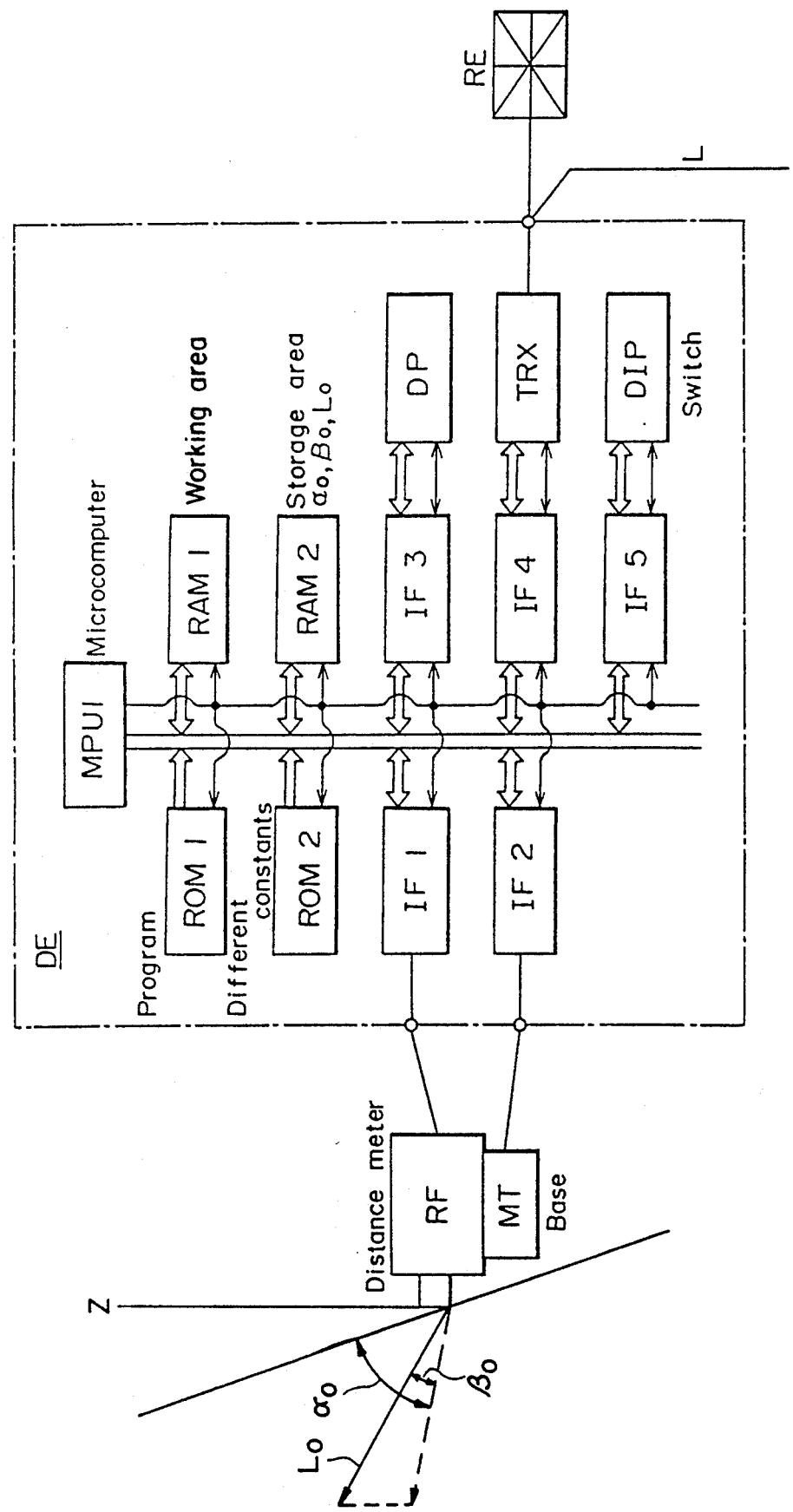
FIG. 7 is a block circuit diagram showing an embodiment of the fire detecting device according to the present invention.

The forgoing is further explained with the aid of the figures. FIG. 7 is a block diagram showing the fire detecting device according to the present invention. The following references are used in FIG. 7:

RF   Laser type distance meter or range finder to measure the distance and output the measured distance data MT   Mounting base or electrically operated turn base on which the distance meter RF is mounted so that the entire space can be scanned for fire surveillance by moving the measuring beam in horizontal and vertical directions and which also outputs its own turning positions, i.e. rotation and elevation angles.

DE   Detecting unit which outputs instructions for distance measuring and turning to the distance meter RF and the electrically operated turn base MT respectively, and which makes a 'fire' judgement using measured distance data provided by the distance meter RF as per the instructions for distance measuring and with the data on rotation and elevation angles provided by the electrically operated turn base MT as per the instructions for turning.

RE   Fire control panel which receives the 'fire' judgement made by the detecting unit DE through the signal line L.

The fire detecting device according to the present invention comprises the detecting unit DE, distance meter RF and electrically operated turn base MT.

Figure 8:
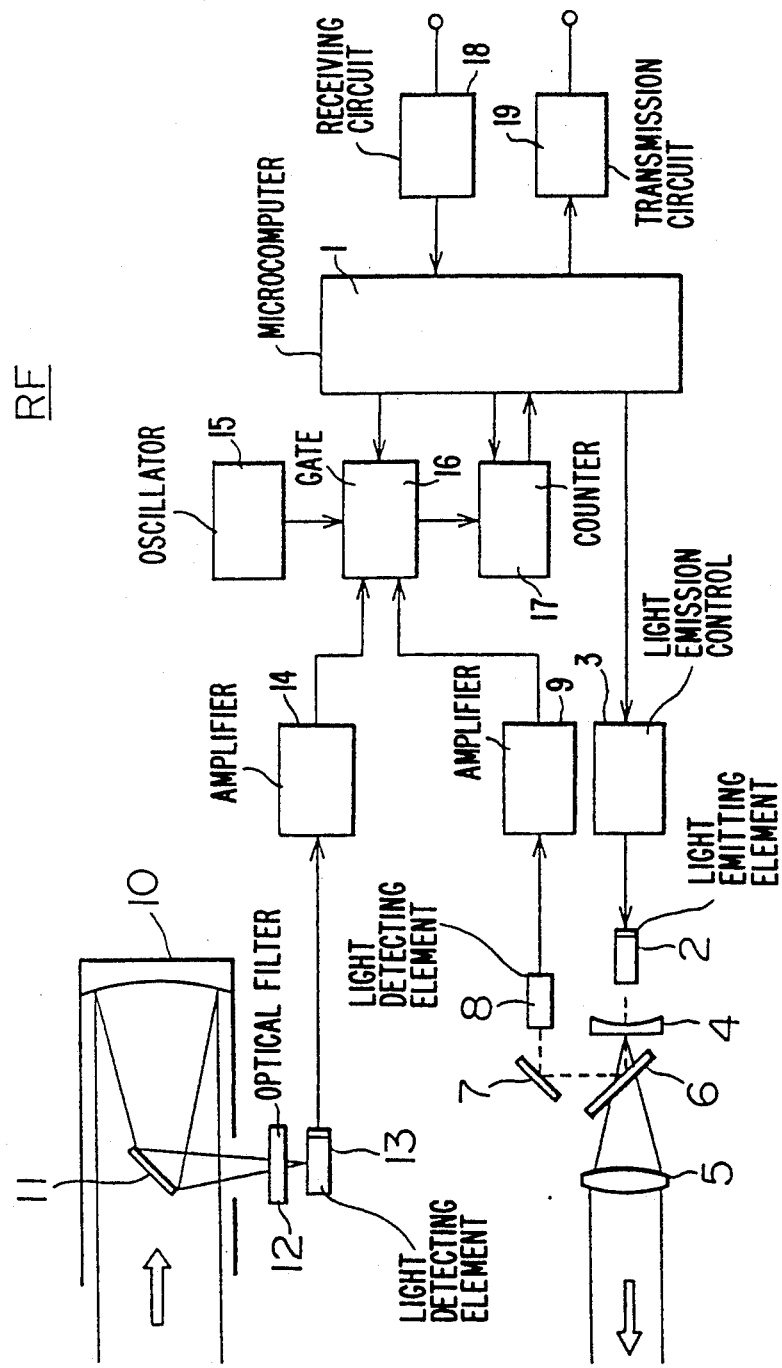
FIG. 8 is a block circuit diagram showing an embodiment of the internal circuit of the distance meter shown in FIG. 7.

The following components are used in the detecting unit DE:

MPU1   Microcomputer
ROM1   Storage area to store programs shown with the flowcharts in FIG. 9A AND 9B which will be described later.
ROM2   Storage area to store different constants
RAM1   Working storage area
RAM2   Storage area to store the rotation and elevation angles $\alpha_0$, $\beta_0$ and distance $L_0$ to each surveillance point
DP   Display such as indication lamp or CRT
DIP   Dip switch used for setting the self-address and resetting the rotation and elevation angles $\alpha_0$, $\beta_0$ and distance $L_0$.
TRX   Transceiving unit equipped with receiving circuit, serial-parallel converter, parallel-serial converter and transmission circuit.
IF1~IF5   Interfaces FIG. 8 shows the internal circuit of the distance meter RF shown in FIG. 7. The following references are used in the internal circuit shown in FIG. 8.

1   Microcomputer
2   Light emitting element such as laser diode which emits light having a wavelength ranging from 0.6~3 microns
3   Light emission control circuit which causes the light emitting element 2 to emit pulsed light as per control by microcomputer 1
4   Concave lens to expand the light emitted from the light emitting element 2
5   Convex lens which shapes the light spread by the concave lens 4 to a beam of light
6   Half mirror
7   Mirror
8   Photodiode which detects the light emitted from the light emitting element 2
9   Amplifier
10   Reflecting mirror to condense the reflected light, i.e. the light (laser beam) emitted from the light emitting element 2 and reflected from the wall face, floor surface, etc.
11   Mirror
12   Optical filter 13 Light receiving element such as avalanche photodiode or PMT (photomultiplier) to detect the reflected light, i.e. the light (laser beam) emitted from the light emitting element 2 and reflected from the wall face, floor surface, etc. The avalanche photodiode is to be used in the embodiment according to the present invention.

14 Amplifier

15 Oscillator with a frequency of, for example, 150 MHz

16 Gate circuit which is opened when the received light amplifying output of the amplfier 9 has reached a predetermined wave-height, allowing the oscillation signal from the oscilator 15 to pass, and which is closed when the received signal amplifying output of the amplifier 14 has reached a predetermined wave-height to inhibit passing of the oscillation signal from the oscillator 15.

17 Counter for oscillation signal input through the gate circuit 16

18 Receiving circuit to receive control signals from the detecting unit DE

19 Transmission circuit to output signals such as distance signals to the detecting unit DE The distance meter RF controls the light emission control circuit 3 and causes the light emitting element 2 to emit pulsed light when the microcomputer 1 has acknowledged the receipt of the distance measuring instruction from the detecting unit DE through the receiving circuit 18. Simultaneously the distance meter RF outputs the operation permission signal to the gate circuit 16 as well as the clear signal to counter 17.

When the photodiode 8 has detected the pulsed light emitted from the light emitting element 2, the gate circuit 16 is opened to input the oscillation signal from the oscillator 15 to the counter 17, which counts the oscillation signal.

When the avalanche photodiode 13 has received the reflected light from the point where the light from the light emitting element 2 was emitted such as a wall face, floor surface or ceiling surface, the gate circuit 16 is closed by the received light output and the counter 17 stops counting the oscillation signal.

The microcomputer 1 reads in the counted value from the counter 17 and computes the time elapsed from the start of light emission to the receipt of the light from this counted value and the distance to the opposite surface from this computed time and the speed of light, then outputs this distance data to the detecting unit DE through the transmission circuit 19.

While in the present embodiment the computation of distance is performed by the distance meter RF, the distance computation may be performed by the detecting unit DE.

When using the reflected light intensity, i.e. received light intensity for discrimination, a sample hold circuit and AD converter, for example, may be provided and arranged in such a way that the output of the amplifier 14 is sampled by the sample hold circuit in synch with the pulsed light emission and the sampled analog output is converted to a digital signal which is input to the microcomputer 1, and then this data is output to the detector unit DE.

Although no details are shown here with respect to means to detect position data on the electrically operated turn base MT, i.e. rotation angle and elevation angle, a potentiometer or a pulse driven step motor can be used.

The operation of an embodiment of the fire detecting device including the distance meter RF and the detecting unit DE as shown in FIG. 7 is described below with the aid of the flowcharts in FIG. 9A, 9B and 10.

As described above, smoke surveillance can be carried out by distance measurement and also by measuring the reflected light intensity. In the present embodiment only the surveillance by distance measurement is described.

Firstly, actions are taken to measure distances to a plurality of objective points of surveillance in a surveillance space, for example, as shown in FIG. 1 by means of the distance meter RF and to store the rotation angle $\alpha_0$, elevation angle $\beta_0$ and distance $L_0$ of the base MT to each of the surveillance points in the reference data storage area RAM2 for use as reference values in the 'fire' judgement action (Steps 904~920).

In this case, each objective point for smoke surveillance by the fire detecting device can be determined with the elevation angle of the base MT set to be a fixed angle $\beta_0$ and the rotation angle set to a certain angle $\alpha_0$ as reached when the base is turned, for example twice, from a reference position. Then, the distance data $L_0$ to each objective point for surveillance (e.g. wall face facing the distance meter RF) is read for each rotation angle $\alpha_0$ and elevation angle $\beta_0$ and stored in the reference data storage area RAM2 together with the corresponding rotation angel data $\alpha_0$ and elevation angle $\beta_0$ from the reference position.

For flame surveillance by the fire detecting device the objective point for surveillance is set at such a position as reached when the base MT is turned horizontally and vertically, for instance twice, at certain angles from certain reference positions. Then, the distance data $L_0$ to the objective point for surveillance (e.g. wall face and floor surface facing the distance meter RF) is read in for each rotation angle $\alpha_0$ and elevation angle $\beta_0$ and stored in the reference data storage area RAM2 together with the corresponding rotation angle data $\alpha_0$ and elevation angle data $\beta_0$ of the base from the reference position.

Further, for both smoke and flame surveillance by the fire detecting device it is possible to take the reference data by turning the distance meter horizontally and vertically, for instance twice, as done for flame surveillance and to store them in the reference data storage area RAM2.

Figure 9B:
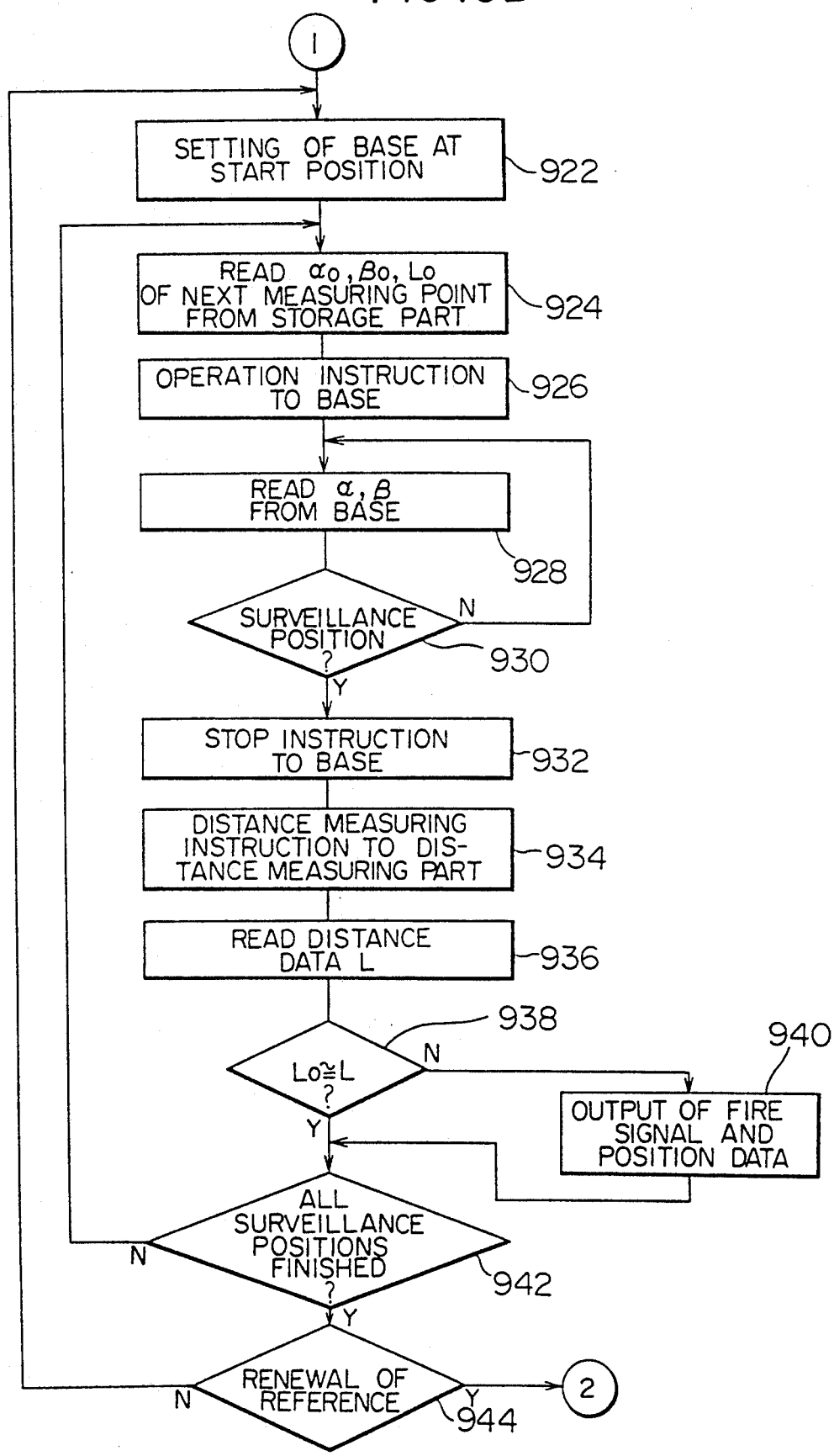
Figure 10:
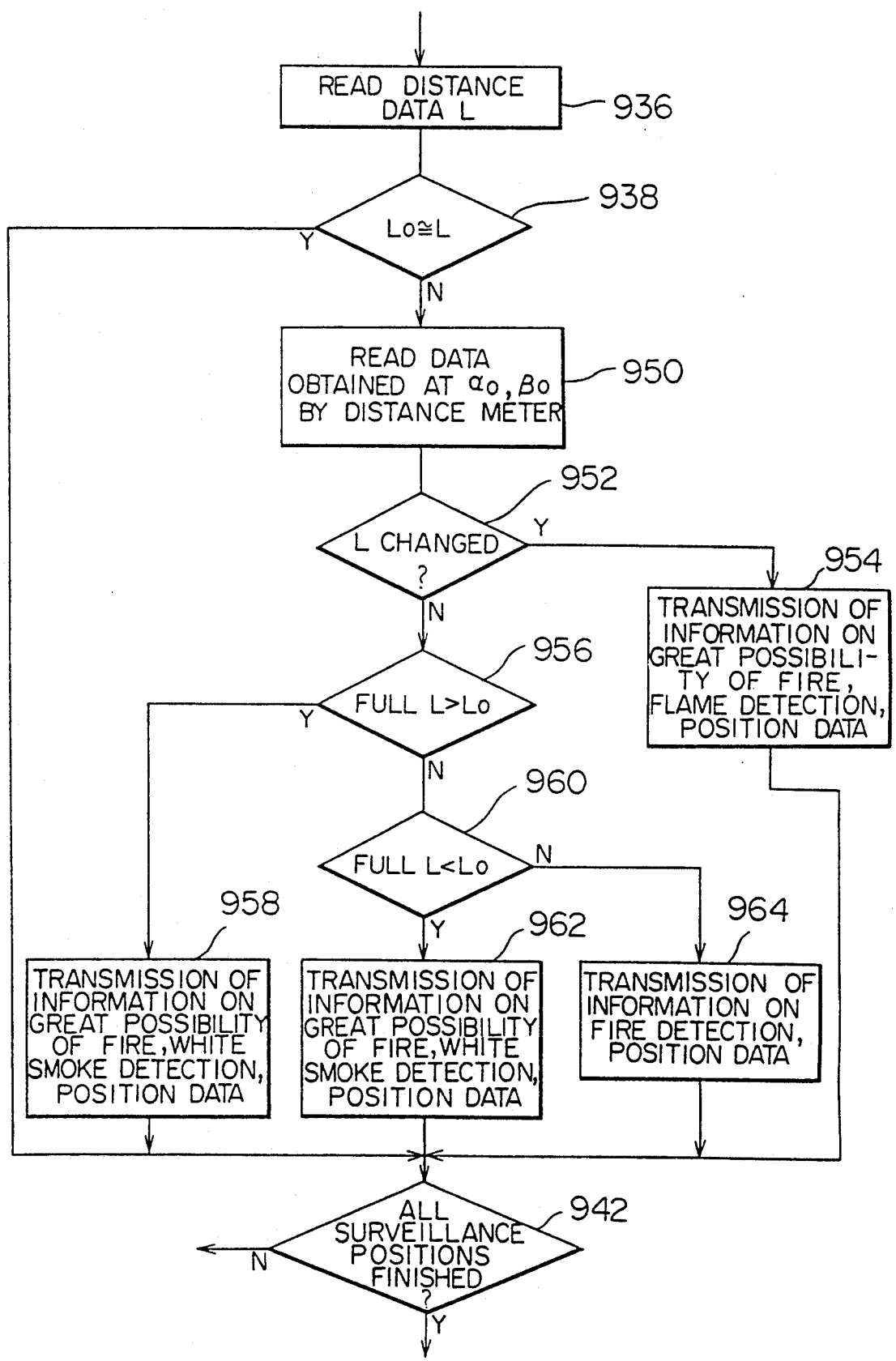
FIG. 10 shows a flowchart example of the discrimination program for white smoke, black smoke and flame.

The flowcharts shown in FIGS. 9A, 9B and 10 describe the operations for both smoke and flame surveillance.

After storing the rotation angle $\alpha_0$, elevation angle $\beta_0$ and distance $L_0$ as reference data for each objective point for surveillance in the reference data storage means RAM2 at Steps 904~920, the base MT is turned to direct the distance meter RF toward each objective point for surveillance in sequence, thus performing the fire surveillance operation and, measuring the distance L to each objective point for surveillance by the distance meter RF. Each distance L measured is stored in the working area RAM1 (Steps 922~936), then the distance L stored in the working area RAM1 is compared with the reference distance $L_0$ to the same objective point for surveillance stored in the reference data storage area RAM2 (Step 938). If L is almost equal to $L_0$, it means that there is no smoke or flame between the distance meter RF and the objective point for surveillance, and the same surveillance operations starting from step 924 are performed at the next objective point for surveillance. If L exceeded the permissible range and showed a deviation from $L_0$, it is judged as a 'fire' and the information, e.g. rotation angle $\alpha_0$, elevation angle $\beta_0$ of the base and distance $L_0$ to the objective point for surveillance are output to the fire control panel RE and/or the like (Step 940).

FIG. 10 shows another embodiment of Step 940 shown in FIG. 9B, which is an example of programs to discriminate modes of fire occurrence, i.e. whether it is due to white smoke, black smoke or flames when the 'fire' judgement is given at Step 938. This discrimination is made by a difference in characteristics among white smoke, black smoke and flames. As illustrated in FIG. 2, white smoke has such characteristics as to cause a decrease in the distance measured with little fluctuation. Black smoke exhibits such characteristics as to cause an increase in the distance measured with little fluctuation, with the increased value approaching infinity. Flames exhibit such characteristics as to cause changes in the measured distance with larger fluctuations than with smoke.

If, as a result of comparison at Step 938 in FIG. 10, it is judged that L has deviated from $L_0$ (N at Step 938), the distance meter RF is fixed for the objective point for surveillance, and the distance meter data at said objective point for surveillance by a predetermined time is read (Step 950). Then, a judgement is made on the basis of the data obtained during said predetermined time as to whether or not there is any change in the measured value (Step 952). If the result of judgement reveals such a change as shown in FIG. 6 (Y at Step 952), it means that there is a substantial possibility of the occurrence of fire, i.e. flames, and position data $\alpha$ and $\beta$ and information of flame occurrence are transmitted to the fire control panel RE (Step 954).

If there is no change in the distance data L (N at Step 952), and yet all distance data L are larger than the reference data $L_0$ (Y at Step 956), it indicates the presence of black smoke as illustrated in FIG. 4, and the position data and black smoke information are transmitted to the fire control panel (Step 958).

If there is no change in the distance data L and yet all distance data L are smaller than the reference data $L_0$ (N at Step 952, N at step 956, Y at Step 960), it indicates the presence of white smoke as illustrated in FIG. 2, and similarly the position data and white smoke information are transmitted to the fire control panel RE (Step 962).

If there are no large changes in the distance data L, and yet some are larger than the reference data $L_0$ and some are smaller, it is considered that black smoke existed at a certain time in the course of the measurement and white smoke existed at another certain time. As it is considered that a fire occurred in either case, the position data and fire detection information are transmitted to the fire control panel RE (Step 964).

Although it is specified in FIG. 10 that upon detection of a distance change at Step 938 the distance meter is fixed at this point to continuously measure the distance at Step 950, the distance meter may be turned so that the distance is measured every time the distance meter is directed to the point for checking its change with time.

Arrangements may also be made so that the rotation angle $\alpha_0$, elevation angle $\beta_0$ and distance $L_0$ used as reference data relating to the objective point such as a wall face or a floor surface are read and stored not only initially but also at the time alterations are made in the surveillance area by operating the dip switch DIP or control from the fire control panel (Step 944). Thus, it is possible to readily cope with any changes in the surveillance area which may frequently be made in premises like exhibition halls.

Further, a laser beam for the light emitting element 2 and light receiving element 13 is shown, but ordinary light emitting diodes and ordinary photodiodes, for instance, can be used as the light emitting element and light receiving element respectively. When using an ordinary light emitting diode and photodiode, it is convenient to provide a lens so that the light emitting element and light receiving element will emit and receive nearly parallel light. When ordinary light emitting and receiving elements are used, it is possible to provide surveillance for smoke or flame in small spaces. A laser beam is better suited for smoke surveillance of large spaces such as large rooms having a distance to an opposite surface (e.g. wall face) exceeding 100 m as shown in FIG. 1.

While in the present embodiment discrimination of smoke and flame is made only using the measured distance, a more precise surveillance can be provided by making discrimination with reflected light intensity in addition to the discrimination using the measured distance to double discrimination of the presence and kinds of smoke and the distance to smoke.

Also in the present embodiment the distance meter is mounted on a turn base (which turns horizontally and vertically and outputs the rotation angle $\alpha$ and elevation angle $\beta$) and is turned to measure the distance from the distance meter to each point in the surveillance space (and/or reflected light intensity, actually received light intensity) when fire surveillance is started or the distance meter is installed, and to read and store the measured value as a reference distance (and/or reference reflected light intensity). Despite the foregoing, the reference distance (and/or reference reflected light intensity) may be previously stored in the ROM or the like and input from a keyboard or the like.

According to the present invention the distance data based on the beam of light projected to and reflected from the opposite surface, or the reflected light intensity, is previously measured by a beam type measuring means and stored as a reference value. For fire surveillance a detection value measured by the beam type measuring means is compared with the previously stored reference value, and a 'fire' judgement is given if the detection value deviates from the reference value. Therefore it is possible to obtain a fire detecting device which has not been available hitherto and which can provide effective fire surveillance with a single device even for a large volume of space. It also has such an effect that highly precise fire detection can be carried out because it can discriminate among different kinds of smoke and detect the status of flame occurrence from the results of a comparison between the detected value and reference value.

While the embodiments of the present invention, as herein disclosed, constitute a prefered form, it is to be understood that other forms be adopted.

What is claimed is:
1. A fire detection apparatus comprising:
   a distance meter for measuring a plurality of distances to a remote reference object, said distance meter including (a) a light emitter for emitting and directing a pulse of light energy towards said reference object, (b) a light detector for detecting the pulse of light energy reflected from the remote object, and

(c) a distance calculating means for determining the distance to the reference object based on an elapsed time from the emission of the pulse of light energy towards the reference object by said light emitter to the detection of the reflected pulse of light energy by said light detector;

a memory for storing a reference distance from said distance meter to the reference object;

discriminating means for detecting and discriminating the presence of white smoke, black smoke and a flame between said distance meter and the reference object in accordance with said plurality of distances to the reference object measured by said distance meter, said discriminating means detecting white smoke when the distances measured by said distance meter are less than the reference distance and substantially free of fluctuations, said discriminating means detecting black smoke when the distances measured by said distance meter are more than the reference distance and substantially free of fluctuations, and said discriminating means detecting a flame when the distances measured by said distance meter differ from the reference distance and fluctuate substantially.

2. The apparatus as recited in claim 1, further comprising a positioning means for positioning said distance meter to a plurality of predetermined orientations to direct the pulse of light energy towards a plurality of reference objects, respectively, storing a plurality of reference distances associated with the plurality of reference objects in said memory.

3. A fire detection method comprising:

a step of measuring a plurality of distances from a detection position to a remote reference object by repeatedly (a) emitting and directing a pulse of light energy towards the reference object from the detection position, (b) detecting at the detection position the pulse of light energy reflected from the remote object, and (c) determining the distance from the detection position to the reference object based on an elapsed time from the emission of the pulse of light energy towards the reference object to the detection of the reflected pulse of light energy at the detection position;

a step of storing a reference distance from the detection position to the reference object;

a step of detecting and discriminating the presence of white smoke, black smoke and a flame between the detection position and the reference object in accordance with said plurality of distances to the remote object measured during said measuring step, said detecting step including detecting white smoke when the distances measured during said measuring step are less than the reference distance and substantially free of fluctuations, said detecting step including detecting black smoke when the distances measured during said measuring step are more than the reference distance and substantially free of fluctuations, and said detecting step including detecting a flame when the distances measured during said measuring step differ from the reference distance and fluctuate substantially.

4. A fire detection method comprising:

a step of measuring a plurality of distances from a detection position to a remote reference object by repeatedly (a) emitting and directing a pulse of light energy towards the reference object from the detection position, (b) detecting at the detection position the pulse of light energy reflected from the remote object, and (c) determining the distance from the detection position to the reference object based on an elapsed time from the emission of the pulse of light energy towards the reference object to the detection of the reflected pulse of light energy at the detection position, said measuring step further including measuring intensities of reflected pulses of light energy;

a step of storing a reference distance from the detection position to the reference object, and a reference intensity value representative of a state in which an area located between the detection position and the remote object is free of white smoke, black smoke and flames;

a step of detecting and discriminating the presence of white smoke, black smoke and a flame between the detection position and the reference object in accordance with said plurality of distances to the remote object and said intensities of reflected pulses of light energy measured during said measuring step, said detecting step including detecting white smoke when the distances measured during said measuring step are less than the reference distance and substantially free of fluctuations and the measured intensities are less than the reference intensity value, said detecting step including detecting black smoke when the distances measured during said measuring step are more than the reference distance and substantially free of fluctuations and the measured intensities are less than the reference intensity value, and said detecting step including detecting a flame when the distances measured during said measuring step differ from the reference distance and fluctuate substantially.

\* \* \* \* \*